(12) United States Patent
Bentschneider

(10) Patent No.: US 7,490,559 B2
(45) Date of Patent: Feb. 17, 2009

(54) MODULAR BASE FOR INDUSTRIAL TOOLS

(75) Inventor: Stephen E. Bentschneider, Jackson, MI (US)

(73) Assignee: Labor Aiding Systems, Inc., Jackson, MI (US)

( * ) Notice: Subject to any disclaimer, the term of this patent is extended or adjusted under 35 U.S.C. 154(b) by 330 days.

(21) Appl. No.: 10/808,053

(22) Filed: Mar. 24, 2004

(65) Prior Publication Data

US 2005/0109251 A1 May 26, 2005

Related U.S. Application Data

(60) Provisional application No. 60/524,796, filed on Nov. 25, 2003.

(51) Int. Cl.
*A47B 37/00* (2006.01)

(52) U.S. Cl. .................................. 108/50.01; 108/50.02

(58) Field of Classification Search ................. 108/147, 108/50.01, 23; 248/637, 644, 651, 654, 669, 248/678, 125.8, 404, 188.2
See application file for complete search history.

(56) References Cited

U.S. PATENT DOCUMENTS

| 1,107,609 | A | * | 8/1914 | Hardinge | ................. | 108/50.01 |
|---|---|---|---|---|---|---|
| 2,678,489 | A | | 5/1954 | Ratzlaff et al. | | |
| 2,993,740 | A | * | 7/1961 | Good | ........................... | 108/80 |
| 3,017,968 | A | * | 1/1962 | McMahon | ................... | 108/147 |
| 3,347,511 | A | * | 10/1967 | Myers | ........................ | 108/147 |
| 3,608,462 | A | * | 9/1971 | Groshong | ..................... | 108/20 |
| 4,054,096 | A | * | 10/1977 | Wilson et al. | ................ | 108/169 |
| 4,066,023 | A | * | 1/1978 | Hughes | .................... | 108/50.01 |
| 4,272,136 | A | | 6/1981 | Sengua | | |
| 4,681,043 | A | | 7/1987 | Sticht | | |
| 5,116,264 | A | * | 5/1992 | Wiederrich et al. | ........... | 108/23 |
| 5,313,892 | A | | 5/1994 | Tice | | |
| 6,227,357 | B1 | | 5/2001 | Brown, Sr. | | |
| 6,267,064 | B1 | * | 7/2001 | Ostertag et al. | .......... | 108/50.02 |
| 6,343,556 | B1 | | 2/2002 | Lanphear | | |
| 6,595,144 | B1 | * | 7/2003 | Doyle | .......................... | 108/147 |
| 6,682,030 | B2 | | 1/2004 | Santoro et al. | | |
| 6,904,841 | B2 | * | 6/2005 | Bobren et al. | ................ | 108/147 |
| 2002/0083871 | A1 | | 7/2002 | Lanphear | | |
| 2003/0024446 | A1 | | 2/2003 | Lanphear | | |

* cited by examiner

*Primary Examiner*—José V Chen
(74) *Attorney, Agent, or Firm*—Young Basile

(57) ABSTRACT

A modular base for industrial machinery that allows fixturing and tooling of an industrial machine to be replaced without having to realize the cost of having to rebuild and/or replace the surrounding equipment. The present invention provides a mounting table adaptable to be releasably connected to the industrial machine. A plurality of telescopically adjustable legs are connected to the mounting table to provide a height adjustment to the mounting table. The legs have a plurality of rollers connected thereto for rollably supporting the mounting table. A plurality of mounting platforms are also connected to the legs and adaptable to be releasably fixtured to a foundation. A light fixture is connected to and extends from the mounting table and is adaptable to cast light on the industrial machine. A programmable controller is coupled to the mounting table and is adaptable to be releasably coupled to and in communication with the industrial machine. A pneumatic controller is coupled to the mounting table and is adaptable to communicate with the industrial machine. A control panel is coupled to and in communication with the programmable controller and is adaptable to manipulate the industrial machine.

18 Claims, 2 Drawing Sheets

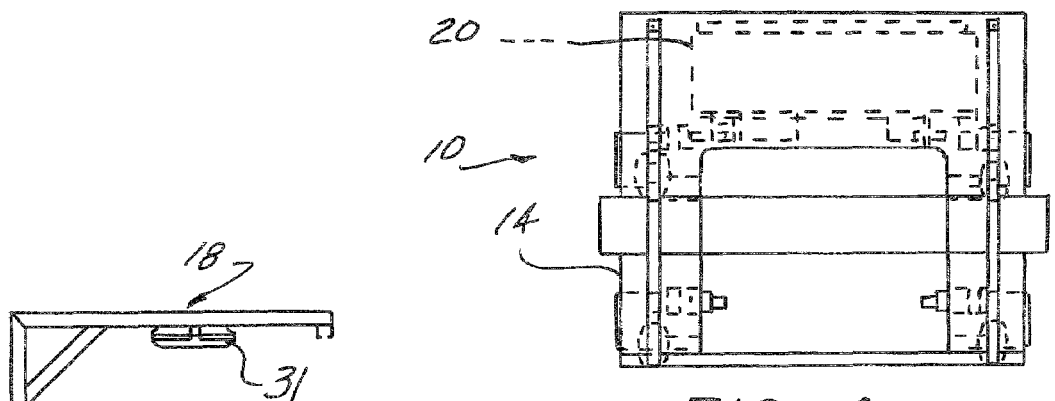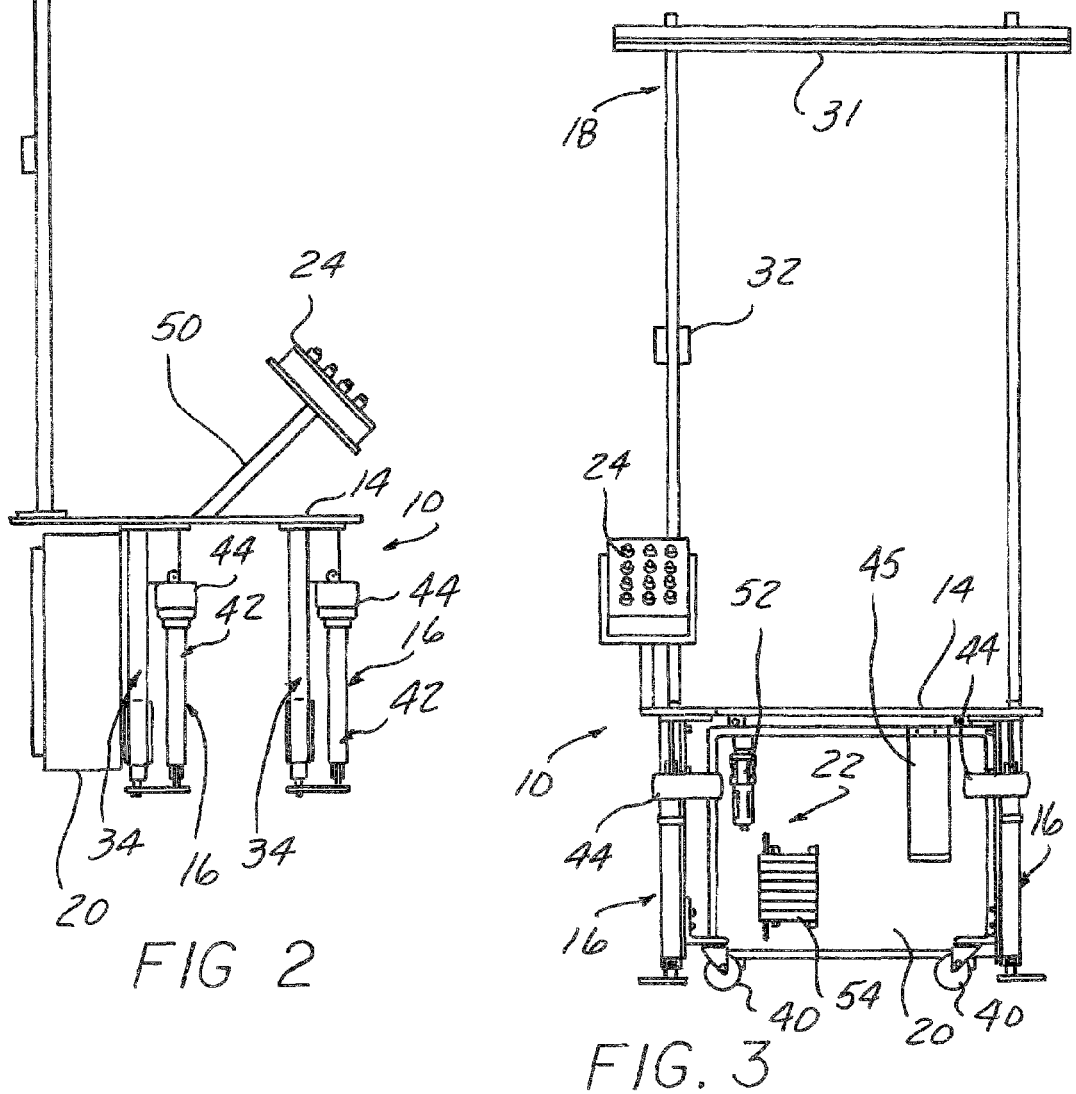

MODULAR BASE FOR INDUSTRIAL TOOLS

The following patent application claims priority of provisional patent application Ser. No. 60/524,796 filed Nov. 25, 2003.

FIELD OF THE INVENTION

The present invention relates to modular tooling, and in particular, a modular base adaptable to releasably receive an industrial machine having a fixture and/or tooling.

BACKGROUND OF THE INVENTION

Due to the development of a worldwide marketplace, the manufacturing industry has become extremely competitive. One of the largest costs in the manufacturing industry, and one which has been on the rise for the past couple of years, has been the cost of fixtures and tooling for industrial machinery. The reason for the high cost is that the fixtures and tooling for the industrial machinery are typically customized for a specific operation and/or workpiece. In addition, various companies and/or manufacturing facilities may require different specifications for their industrial machinery thereby requiring machine builders to further customize their machines.

The problem with customizing such industrial machinery is that the machinery must either be replaced or rebuilt if the manufacturing operation and/or workpiece is changed. In addition, customization of the equipment may prevent the machinery from being transferred to another company or manufacturing facility due to the machinery not meeting the receiving company or manufacturing facility's specifications. Even when the equipment can be rebuilt for a new operation, workpiece, or manufacturing facility, the rebuilding costs are often prohibitive since fixturing and tooling must typically be replaced. Thus, the rebuilding of the machinery to remove and replace the fixturing and/or tooling often dictates that the user simply purchase new equipment.

It would be desirable to provide an industrial piece of machinery that was modular in design so that the fixturing and/or tooling of the industrial machinery could easily be replaced without the cost of having to rebuild and/or replace the surrounding equipment.

SUMMARY OF THE INVENTION

The present invention relates to a modular base for industrial machinery that allows for the fixturing and tooling of an industrial machine to be replaced without having to realize the cost of having to rebuild and/or replace the surrounding equipment. The present invention provides a mounting table adaptable to be releasably connected to the industrial machine. A plurality of telescopically adjustable legs are connected to the mounting table for adjustably positioning the mounting table to a desired height. A plurality of rollers are connected to the legs for rollably moving the mounting table to a desired location. A plurality of mounting platforms are coupled to the mounting table and are adaptable to be releasably fixtured to a foundation. Each leg has an electric drive connected thereto for driving the telescopic adjustment of the legs. A lighting fixture is connected to and extends from the mounting table and is adaptable to cast light on the industrial machinery. A programmable controller is coupled to the mounting table and is adaptable to be in communication with the industrial machine. A pneumatic controller is coupled to the mounting table and is adaptable to communicate with the industrial machine. A control panel is coupled to and in communication with the programmable controller and is adaptable to manipulate the industrial machine.

BRIEF DESCRIPTION OF THE DRAWINGS

The description herein makes reference to the accompanying drawings, wherein like referenced numerals refer to like parts throughout several views, and wherein:

FIG. 2 is a plan side view of the modular base for industrial machinery of the present invention.

FIG. 3 is a front plan view of the modular base for industrial machinery of the present invention.

FIG. 4 is a top plan view of the modular base for industrial machinery of the present invention.

DESCRIPTION OF THE PREFERRED EMBODIMENT

Figure 1:
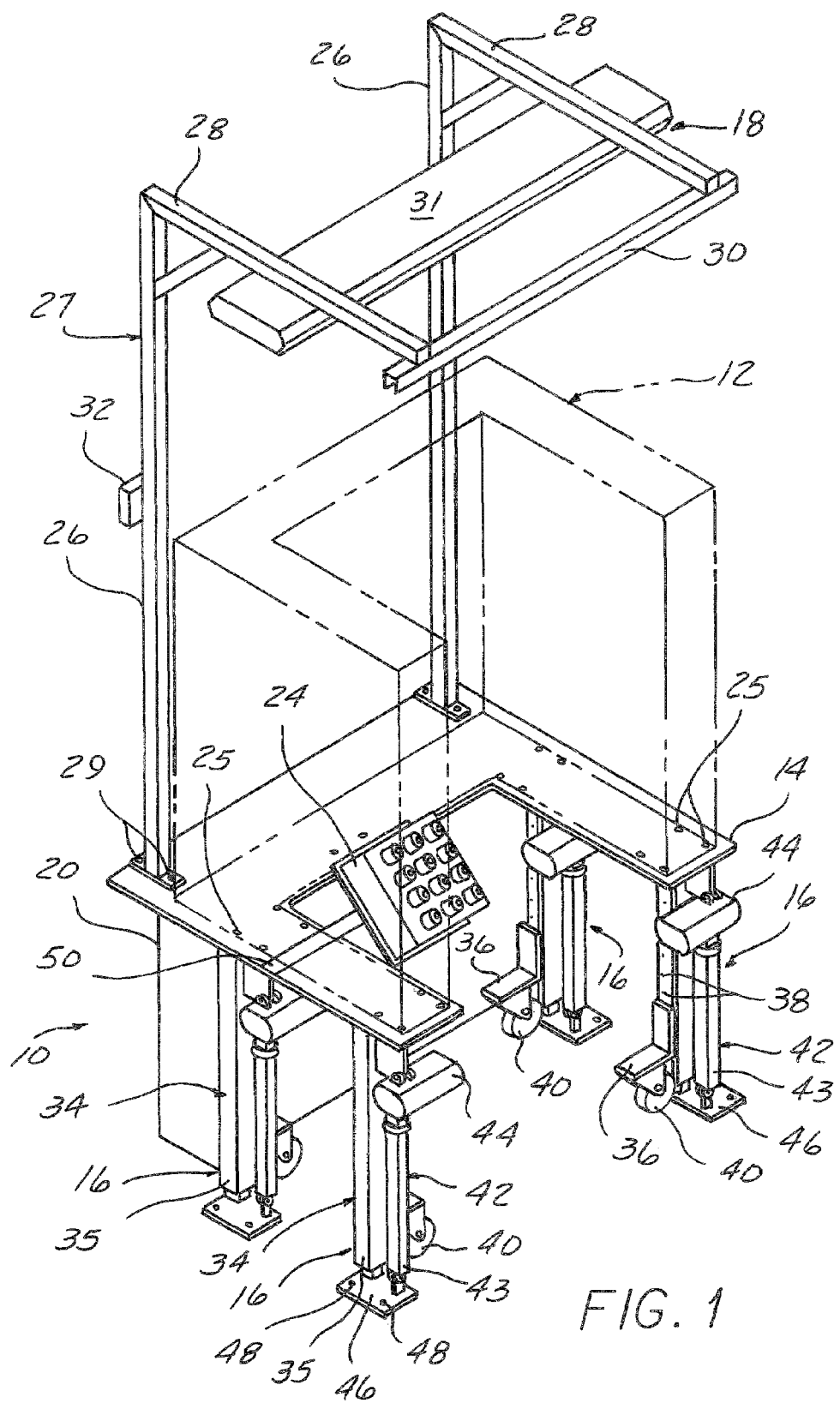
FIG. 1 is a perspective view of a modular base for industrial machinery of the present invention.

Referring to the drawings, the present invention will now be described in detail with reference to the disclosed embodiment.

FIGS. 1-4 illustrate a modular base 10 for receiving and supporting an industrial machine 12 having various types of fixturing (not shown) and tooling (not shown). Although not limited in its use, the modular base 10 is ideally suited for industrial machinery 12, such as automobile headrest stuffers, automobile headrest closures, automobile armrest paddle compression stuffers, paddle compression fixtures, etc. The modular base 10 provides a mounting table 14 that is adaptable to releasably receive the industrial machine 12. Four adjustable legs 16 and a light fixture 18 are connected to the mounting table 14, wherein the light fixture 18 extends over the industrial machine 12 to cast light on the industrial machine 12 and its surrounding area. A programmable controller 20 is connected to the mounting table 14 of the modular base 10 and is in communication with the industrial machine 12. A pneumatic controller 22 is connected to the programmable controller 20 and is adapted to communicate with the industrial machine 12. A control panel 24 is connected to the mounting table 14 and is in communication with the programmable controller 20. The control panel 24 is adaptable to manipulate the industrial machine 12.

Attention is drawn to the fact that the mounting table 14 has a plate-like, substantially U-shaped configuration so that a user may stand within the opening of the U-shaped configuration and gain access to the industrial machine 12. The mounting table 14 has a plurality of apertures 25 extending therethrough whereby the industrial machine 12 may be releasably connected to the mounting table 14 by releasable fasteners, such as threaded bolts and nuts (not shown). The mounting table 14 is fabricated from hot rolled steel to provide a material that will support the weight of the industrial machine 12.

For the purpose of casting light on the industrial machine 12, the light fixture 18 is connected to and extends upward from the mounting table 14. The light fixture 18 provides a substantially L-shaped frame 27 having a pair of spaced vertical supports 26 that are substantially parallel to one another and are connected to the mounting table 14 by threaded fasteners 29. A pair of horizontal supports 28 of the light fixture 18 extend outward from the vertical supports 26 at a position above the industrial machine 12. The horizontal supports 28 are substantially parallel to one another and extend at substantially right angles to the vertical supports 26. A cross-member 30 connects the ends of the horizontal supports 28 at a substantially right angle to the horizontal supports 28. The horizontal supports 28 extend over the industrial machine 12 substantially parallel to the mounting table 14. A fluorescent light 31 is connected to the horizontal supports 28 and hangs over the industrial machine 12 to cast light on the industrial machine 12. An electrical outlet 32 may be connected to the vertical supports 26 of the light fixture 18 to supply electrical power to any supplemental machinery or tooling that may require electrical power.

It is contemplated that to position and support the mounting table 14, means for adjusting the position of the mounting table 14 includes four legs 16 that are connected to the underside of the mounting table 14. Each leg 16 has a pair of substantially parallel, substantially vertical supports 34, 42. The first support 34 includes a substantially rectangular column 35 having an L-shaped bracket 36 that is adjustably mounted to the column 35. A plurality of apertures 38 extend through the column 35, and fasteners (not shown) mounted on the L-shaped bracket 36 engage the apertures 38 therein. The fasteners on the L-shaped bracket 36 may engage any of the apertures 38 provided in the column 35 in order to adjust the height of the L-shaped bracket 36. Each L-shaped bracket 36 has a caster wheel 40 mounted thereon. The caster wheels 40 allow the modular base 10 to be rolled into a desired position.

The second support 42 has a telescopic, substantially rectangular column 43 wherein each column 43 has an electric drive 44 mounted between the column 43 and the mounting table 14 to electrically drive telescopic adjustment of the second supports 42. The electrical drives 44 may also provide a leveling adjustment to the modular base 10 by adjusting the height of each column 43 individually. The drives 44 are electrically connected to a central drive controller 45 to actuate and control the drives 44. Although the present invention is ideally suited for powered telescopic adjustment of the second supports 42 by the electric drives 44, the telescopic adjustment of the second supports 42 may be manually or mechanically adjusted by utilizing a pin (not shown) inserted within corresponding apertures (not shown) provided within the second supports 42.

To secure the mounting table 14 to the foundation, means for releasably securing the mounting table 14 to the foundation include the use of four mounting plates 46. The mounting plates 46 are connected to the bottom of each of the columns 43 of the second supports 42, and each mounting plate 46 has a pair of apertures 48 extending therethrough. Releasable fasteners (not shown) may extend through the apertures 48 of the mounting plates 46 in order to releasably connect the modular base 10 to the foundation.

In order to provide programming capability to the industrial machine 12, the programmable controller 20 is mounted to the underside of the mounting table 14. The industrial machine 12 is wired to the programmable controller 20 to provide electronic communication between the programmable controller 20 and the industrial machine 12. The control panel 24 is mounted to a bracket 50 which is connected to the mounting table 14. The bracket 50 supports the control panel 24 in a position whereby the user may easily access the control panel 24. The control panel 24 is in communication with the programmable controller 20 so that the industrial machine 12 may be manipulated through the actuation and use of the control panel 24. Although the present invention is ideally suited for the use of the electrical programmable controller 20, a pneumatic controller (not shown) may also be utilized in substitution thereof.

Since the industrial machine 12 often utilizes a supply of pressurized air, the pneumatic controller 22 provides an air regulator 52 and an air actuator 54 connected to the programmable controller 20. The pneumatic controller 22 is in communication with a pressurized air source (not shown) and the programmable controller 20 such that the actuation of the pneumatic controller 22 is controlled by signals received from the programmable controller 20.

In operation, the industrial machine 12 is releasably fastened to the mounting table 14. The programmable controller 20 is wired to the industrial machine 12 to manipulate the industrial machine 12 in a desired fashion. The pneumatic controller 22 is also connected to the industrial machine 12 so that the proper pneumatic controls are provided. The modular base 10 and the industrial machine 12 may then be rolled into its proper position through the use of the caster wheels 40. Once the modular base 10 and the industrial machinery 12 are in the proper position, the second supports 42 of the legs 16 may then be vertically adjusted by use of the electrical drives 44. Once the proper height of the industrial machinery 12 is determined, the modular base 10 may be mounted to the foundation through the use of the mounting plates 46. If light is desired to be cast on the industrial machinery 12, the fluorescent light 31 on the light fixture 18 may be actuated.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims which scope is intended to be accorded the broadest interpretation so as to encompass all such modifications and equivalent structures as is permitted under the law.

What is claimed is:

1. A modular base for an industrial machine having various types of fixturing and tooling configured to perform a specific manufacturing operation, comprising:

a mounting table adapted to support the industrial machine, said mounting table fabricated from hardened steel and having a substantially plate-like configuration;

a plurality of apertures extending through said mounting table, each said aperture configured to receive a fastener adapted to releasably secure the industrial machine to said mounting table;

a plurality of telescopically adjustable legs each connected to said mounting table;

a plurality of mounting plates that are connected to said telescopically adjustable legs and are releasably secured to a foundation, wherein telescopic adjustment of said telescopically adjustable legs changes the spacing between said mounting plates and said mounting table; and a control panel electrically connected to the industrial machine for electronic communication with the industrial machine, wherein operation of the control panel causes the industrial machine to perform the specific manufacturing operation.

2. The modular base stated in claim 1, further comprising:
a plurality of electric drives, each said electric drive connected to a respective telescopically adjustable leg of said plurality of telescopically adjustable legs, wherein each electric drive of the plurality of electric drives is independently operable to provide an independent height adjustment of each telescopically adjustable leg to adjustably position said mounting table at a desired height.

3. The modular base stated in claim 1, further comprising:
a pair of vertical supports connected to the mounting table;
a pair of horizontal supports connected to the vertical supports and extending over the mounting table;
a cross-member extending between the horizontal supports; and a light fixture connected to and extending between said horizontal supports and adaptable to cast light onto the industrial machine.

4. The modular base stated in claim 1, further comprising:
a pneumatic controller coupled to said mounting table and pneumatically connected to the industrial machine for pneumatic communication with the industrial machine.

5. The modular base stated in claim 2, further comprising:
a plurality of rollers connected to said plurality of telescopically adjustable legs for rollably moving said mounting table to a desired location, wherein adjustment of said plurality of telescopically adjustable legs changes the spacing between said plurality of rollers and the foundation to selectively engage and disengage said plurality of rollers with the foundation.

6. A modular base for an industrial machine having various types of fixturing and tooling configured to perform a specific manufacturing operation, comprising:
a mounting table adapted to support the industrial machine, said mounting table fabricated from hardened steel and having a substantially plate-like configuration;
a plurality of apertures extending through said mounting table, each said aperture configured to receive a fastener adapted to releasably secure the industrial machine to said mounting table;
a plurality of telescopically adjustable legs each connected to said mounting table, each said telescopically adjustable leg having a first support with a roller connected thereto, and a second support having an independently operable electric drive to independently adjust the height of each leg and to change the spacing between said roller and a foundation to selectively engage and disengage said roller with the foundation; and
a plurality of mounting plates that are connected to said telescopically adjustable legs and are releasably secured to the foundation, wherein telescopic adjustment of said telescopically adjustable legs changes the spacing between said mounting plates and said mounting table.

7. The modular base stated in claim 6, wherein said mounting table further comprises:
a substantially horizontal U-shaped plate, wherein an open end of said U-shaped plate is accessible to a user.

8. The modular base stated in claim 6, further comprising:
a pair of vertical supports connected to the mounting table;
a pair of horizontal supports connected to the vertical supports and extending over the mounting table;
a cross-member extending between the horizontal supports; and
a light fixture connected to and extending between said horizontal supports and adaptable to cast light onto the industrial machine.

9. The modular base stated in claim 6, further comprising:
a programmable controller coupled to said mounting table, in electrical communication with the industrial machine, and configured to provide programming capability to the industrial machine.

10. The modular base stated in claim 9, further comprising:
a control panel coupled to said mounting table and in electrical communication with said programmable controller, wherein operation of the control panel causes the industrial machine to perform the specific manufacturing operation.

11. The modular base stated in claim 6, further comprising:
a pneumatic controller coupled to said mounting table and pneumatically connected to the industrial machine for pneumatic communication with the industrial machine.

12. The modular base stated in claim 6, wherein said rollers are vertically adjustable with respect to said second supports and adjustment of said rollers and telescopic adjustment of said telescopically adjustable legs occur along parallel axes.

13. The modular base stated in claim 6, wherein said first and second supports are substantially vertical.

14. A modular base for an automotive stuffer fixture or closure fixture configured to perform a specific manufacturing operation, comprising:
a mounting table adapted to support the industrial machine, said mounting table fabricated from hardened steel and having a substantially plate-like configuration;
a plurality of apertures extending through said mounting table, each said aperture configured to receive a fastener adapted to releasably secure the fixture to said mounting table;
a plurality of telescopically adjustable legs each connected to said mounting table, each said telescopically adjustable leg having a first support with a roller connected thereto and a second support having an independently operable electric drive to independently adjust the height of each leg, and to change the spacing between said roller and a foundation to selectively engage and disengage said roller with the foundation;
a plurality of mounting plates that are connected to said telescopically adjustable legs and are releasably secured to the foundation, wherein telescopic adjustment of said telescopically adjustable legs changes the spacing between said mounting plates and said mounting table;
a programmable controller coupled to said mounting table, in electrical communication with the fixture, and configured to provide programming capability to the fixture; and
a control panel coupled to said mounting table and in communication with said programmable controller, wherein operation of the control panel causes the fixture to perform the specific manufacturing operation.

15. The modular base stated in claim 14, further comprising:
a pair of vertical supports connected to the mounting table;
a pair of horizontal supports connected to the vertical supports and extending over the mounting table;
a cross-member extending between the horizontal supports; and
a light fixture connected to and extending between said horizontal supports and adaptable to cast light onto the fixture.

16. The modular base stated in claim 14, further comprising:
a pneumatic controller coupled to said mounting table and pneumatically connectable to the industrial machine for pneumatic communication with the fixture.

17. The modular base stated in claim 14, wherein said first and second supports are substantially vertical and adjustment of the rollers and telescopic adjustment of the telescopically adjustable legs occur along vertical axes.

18. The modular base stated in claim 14, further comprising:
a plurality of apertures formed on each first support; and
a plurality of L-shaped brackets each connected to a respective roller, wherein each L-shaped bracket is configured to engage the apertures formed on a respective first support to adjust the vertical position of each roller with respect to the respective first support.

* * * * *